US012811253B2

(12) United States Patent
Yoshida et al.

(10) Patent No.: US 12,811,253 B2
(45) Date of Patent: Nov. 24, 2026

(54) BATTERY PACK

(71) Applicant: Prime Planet Energy & Solutions, Inc., Tokyo (JP)

(72) Inventors: Naotake Yoshida, Himeji (JP); Satoru Matsuyama, Kasai (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 665 days.

(21) Appl. No.: 18/146,463

(22) Filed: Dec. 27, 2022

(65) Prior Publication Data

US 2023/0253684 A1 Aug. 10, 2023

(30) Foreign Application Priority Data

Feb. 4, 2022 (JP) ................................ 2022-016327

(51) Int. Cl.
*H01M 50/507* (2021.01)
*H01M 50/209* (2021.01)
*H01M 50/509* (2021.01)

(52) U.S. Cl.
CPC ....... *H01M 50/507* (2021.01); *H01M 50/209* (2021.01); *H01M 50/509* (2021.01)

(58) Field of Classification Search
None
See application file for complete search history.

(56) References Cited

U.S. PATENT DOCUMENTS

2003/0091896 A1 5/2003 Watanabe et al.
2011/0076521 A1 3/2011 Shimizu et al.
2012/0141857 A1 6/2012 Nakashima et al.
2022/0263201 A1 8/2022 Wang et al.
2023/0246284 A1* 8/2023 Qin .................... H01M 50/291 429/159

FOREIGN PATENT DOCUMENTS

| | | | |
|---|---|---|---|
| CN | 214625276 | * | 11/2021 |
| CN | 113937400 | A | 1/2022 |
| JP | 2003-151526 | A | 5/2003 |
| JP | 2007-157366 | A | 6/2007 |
| JP | 2010-097723 | A | 4/2010 |
| JP | 2013-037861 | A | 2/2013 |
| JP | 201627578 | A | 2/2016 |
| JP | 2017-199563 | A | 11/2017 |
| JP | 2019-186001 | A | 10/2019 |
| JP | 2023-082486 | A | 6/2023 |
| WO | 2021/196796 | A1 | 10/2021 |

OTHER PUBLICATIONS

Machine Translation of CN214625276 (Year: 2021).*

* cited by examiner

*Primary Examiner* — Wyatt P Mcconnell
(74) *Attorney, Agent, or Firm* — HAUPTMAN HAM, LLP

(57) ABSTRACT

A battery pack includes: a first battery assembly including a plurality of first battery cells arranged in a first direction; and a second battery assembly including a plurality of second battery cells arranged in the first direction, the second battery assembly being arranged beside the first battery assembly along a second direction orthogonal to the first direction. Each of the plurality of first battery cells and the plurality of second battery cells includes an electrode terminal. The battery pack further includes a bus bar joined to an electrode terminal of a first battery cell located at a certain portion of the first battery assembly in the first direction and an electrode terminal of a second battery cell.

9 Claims, 11 Drawing Sheets

BATTERY PACK

This nonprovisional application is based on Japanese Patent Application No. 2022-016327 filed on Feb. 4, 2022 with the Japan Patent Office, the entire contents of which are hereby incorporated by reference.

BACKGROUND OF THE INVENTION

Field of the Invention

The present technology relates to a battery pack.

Description of the Background Art

There has been conventionally known a battery pack in which a plurality of battery assemblies are arranged side by side in a transverse direction orthogonal to a stacking direction of battery cells. Such a battery pack is described, for example, in Japanese Patent Laying-Open No. 2016-027578.

SUMMARY OF THE INVENTION

When bus bars provided as collective terminals for both polarities of battery assemblies are drawn out from one side in the transverse direction orthogonal to the stacking direction of the battery cells, a bus bar is likely to be long. When the length of the bus bar is long, vibration and impact acting on the bus bar are increased and it becomes difficult to secure an insulation distance for other components (for example, a battery cell, a frame, and the like). As a result, a degree of freedom in designing the battery pack can be reduced.

The conventional battery pack still has room for improvement in reducing the length of the bus bar in the transverse direction orthogonal to the stacking direction of the battery cells in the battery pack in which the plurality of battery assemblies are arranged side by side in the transverse direction.

An object of the present technology is to provide a battery pack to reduce a length of a bus bar in a transverse direction.

A battery pack according to the present technology includes: a first battery assembly including a plurality of first battery cells arranged in a first direction; and a second battery assembly including a plurality of second battery cells arranged in the first direction, the second battery assembly being arranged beside the first battery assembly along a second direction orthogonal to the first direction. Each of the plurality of first battery cells and the plurality of second battery cells includes an electrode terminal. The battery pack further includes a bus bar joined to an electrode terminal of a first battery cell located at a certain portion of the first battery assembly in the first direction and an electrode terminal of a second battery cell.

The foregoing and other objects, features, aspects and advantages of the present invention will become more apparent from the following detailed description of the present invention when taken in conjunction with the accompanying drawings.

Figure 5:
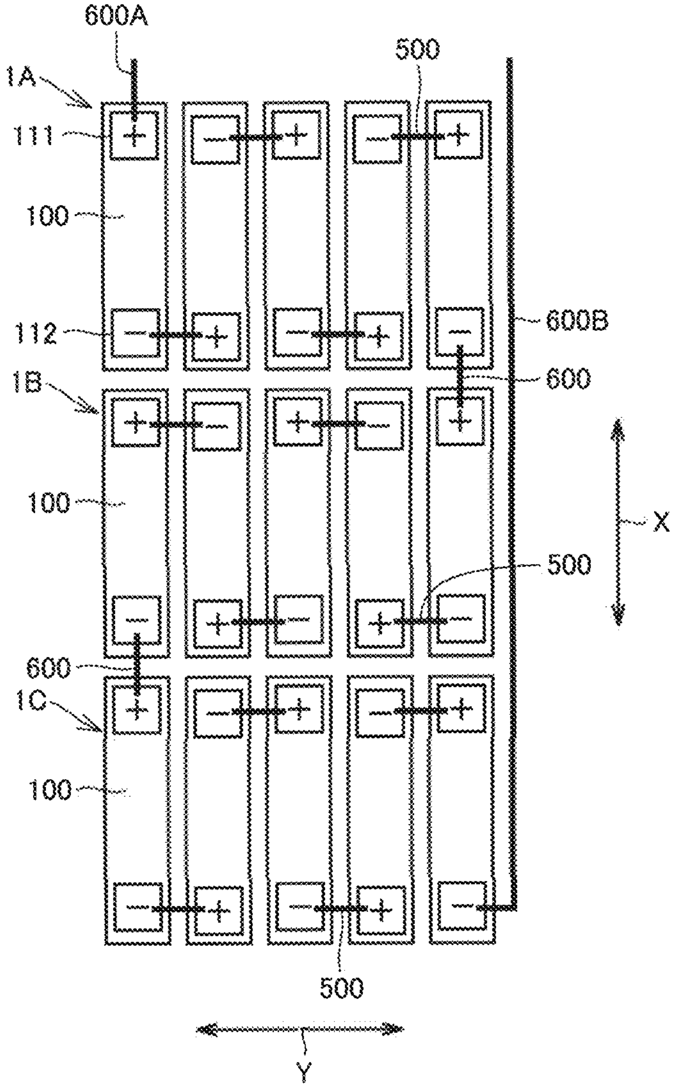
Figure 6:
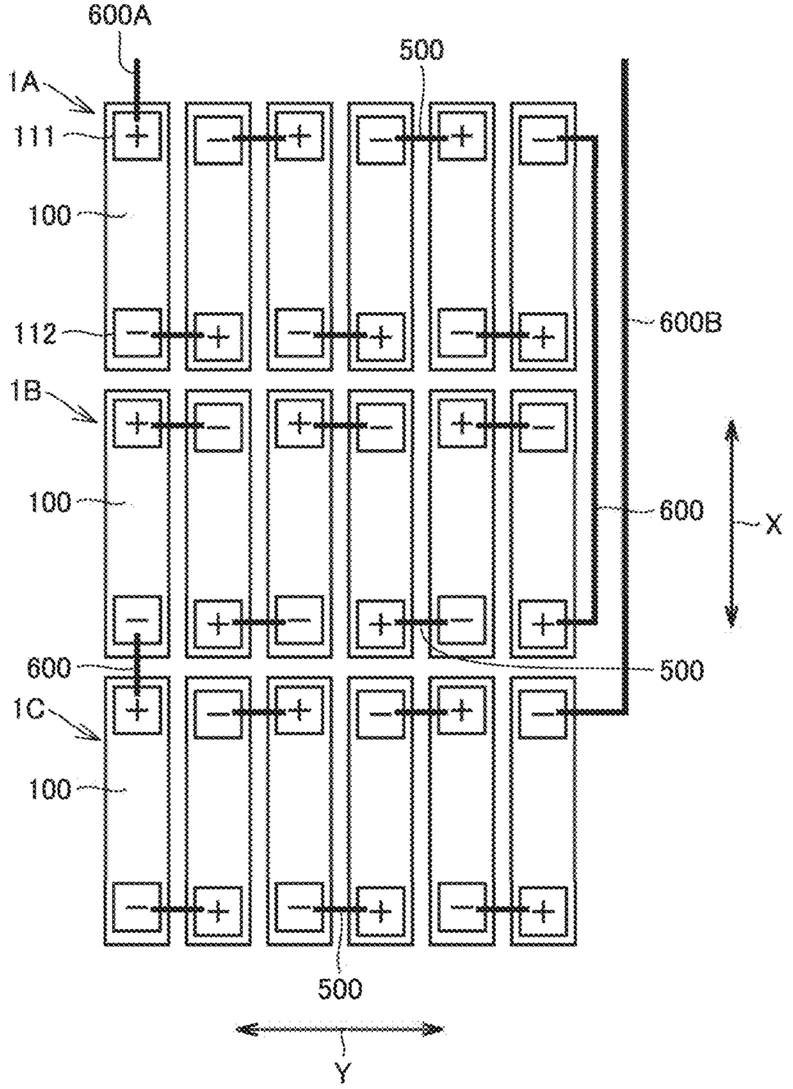

Each of FIGS. 5 and 6 is a diagram showing an arrangement of bus bars according to a reference example.

Each of FIGS. 7 to 13 is a diagram showing an arrangement of bus bars according to an embodiment.

DESCRIPTION OF THE PREFERRED EMBODIMENTS

Hereinafter, embodiments of the present technology will be described. It should be noted that the same or corresponding portions are denoted by the same reference characters, and may not be described repeatedly.

It should be noted that in the embodiments described below, when reference is made to number, amount, and the like, the scope of the present technology is not necessarily limited to the number, amount, and the like unless otherwise stated particularly. Further, in the embodiments described below, each component is not necessarily essential to the present technology unless otherwise stated particularly. Further, the present technology is not limited to one that necessarily exhibits all the functions and effects stated in the present embodiment.

It should be noted that in the present specification, the terms "comprise", "include", and "have" are open-end terms. That is, when a certain configuration is included, a configuration other than the foregoing configuration may or may not be included.

Also, in the present specification, when geometric terms and terms representing positional/directional relations are used, for example, when terms such as "parallel", "orthogonal", "obliquely at 45°", "coaxial", and "along" are used, these terms permit manufacturing errors or slight fluctuations. In the present specification, when terms representing relative positional relations such as "upper side" and "lower side" are used, each of these terms is used to indicate a relative positional relation in one state, and the relative positional relation may be reversed or turned at any angle in accordance with an installation direction of each mechanism (for example, the entire mechanism is reversed upside down).

In the present specification, the term "battery" is not limited to a lithium ion battery, and may include other batteries such as a nickel-metal hydride battery and a sodium ion battery.

In the present specification, the term "battery cell" is not necessarily limited to a prismatic battery cell and may include a cell having another shape, such as a cylindrical battery cell, a pouch battery cell, or a blade battery cell. The "battery cell" can be mounted on vehicles such as a hybrid electric vehicle (HEV), a plug-in hybrid electric vehicle (PHEV), and a battery electric vehicle (BEV). It should be noted that the use of the "battery cell" is not limited to the use in a vehicle.

Figure 1:
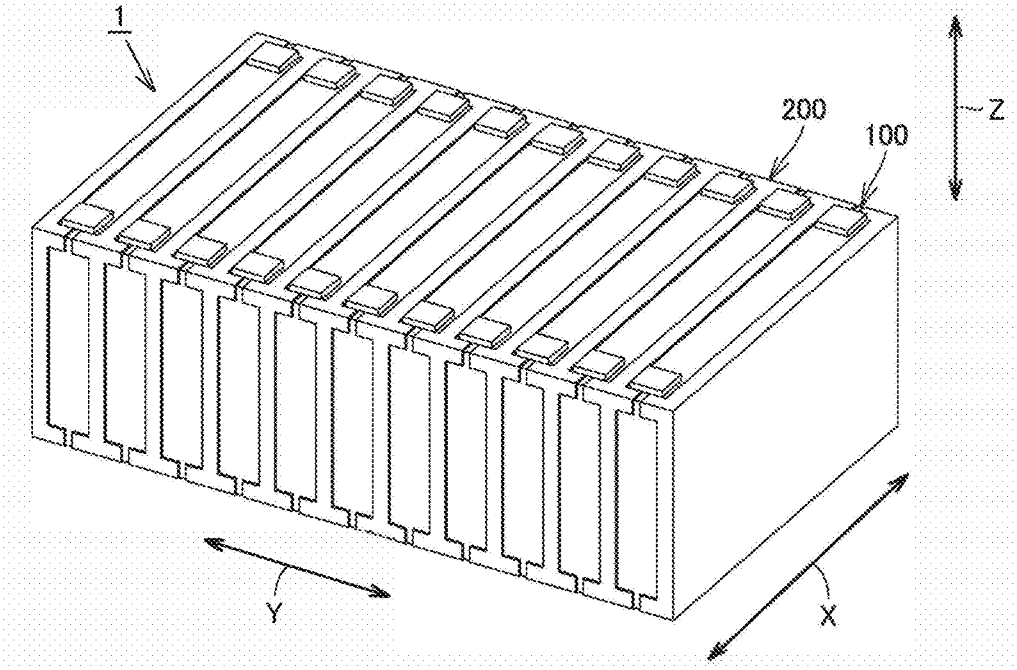
FIG. 1 is a perspective view of a battery assembly.

FIG. 1 is a perspective view of a battery assembly 1. As shown in FIG. 1, battery assembly 1 includes battery cells 100 and separator members 200.

Each of battery cells 100 is a prismatic battery cell, and the plurality of battery cells 100 are provided along a Y axis direction (first direction). Separator members 200 are provided between the plurality of battery cells 100. Each of separator members 200 prevents unintended electrical conduction between adjacent battery cells 100. Separator member 200 secures electrical insulation between adjacent battery cells 100.

Figure 2:
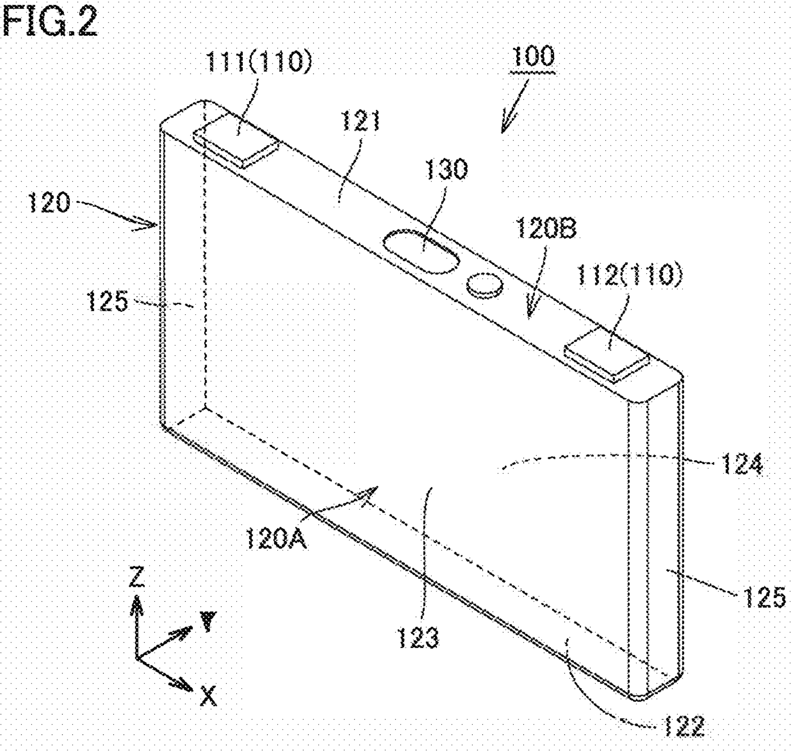
FIG. 2 is a perspective view showing a battery cell included in the battery assembly.

FIG. 2 is a perspective view showing battery cell 100. As shown in FIG. 2, battery cell 100 has a prismatic shape. Battery cell 100 has electrode terminals 110, a housing 120, and a gas-discharge valve 130.

Electrode terminals 110 are formed on housing 120. Electrode terminals 110 have a positive electrode terminal 111 and a negative electrode terminal 112 arranged side by side along an X axis direction (second direction) orthogonal to a Y axis direction (first direction). Positive electrode terminal 111 and negative electrode terminal 112 are provided to be separated from each other in the X axis direction.

Housing 120 has a rectangular parallelepiped shape, and forms an external appearance of battery cell 100. Housing 120 includes: a case body 120A that accommodates an electrode assembly (not shown) and an electrolyte solution (not shown); and a sealing plate 120B that seals an opening of case body 120A. Sealing plate 120B is joined to case body 120A by welding.

Housing 120 has an upper surface 121, a lower surface 122, a first side surface 123, a second side surface 124, and two third side surfaces 125.

Upper surface 121 is a flat surface orthogonal to the Y axis direction and a Z axis direction (third direction) orthogonal to the X axis direction. Electrode terminals 110 are disposed on upper surface 121. Lower surface 122 faces upper surface 121 along the Z axis direction.

Each of first side surface 123 and second side surface 124 is constituted of a flat surface orthogonal to the Y axis direction. Each of first side surface 123 and second side surface 124 has the largest area among the areas of the plurality of side surfaces of housing 120. Each of first side surface 123 and second side surface 124 has a rectangular shape when viewed in the Y axis direction. Each of first side surface 123 and second side surface 124 has a rectangular shape in which the X axis direction corresponds to the long-side direction and the Z axis direction corresponds to the short-side direction when viewed in the Y axis direction.

Basically, a plurality of battery cells 100 are stacked such that first side surfaces 123 of battery cells 100, 100 adjacent to each other in the Y direction face each other and second side surfaces 124 of battery cells 100, 100 adjacent to each other in the Y axis direction face each other (exceptions will be described later). At portions at which the plurality of battery cells 100 are stacked in this way, positive electrode terminals 111 and negative electrode terminals 112 are alternately arranged in the Y axis direction in which the plurality of battery cells 100 are stacked.

Gas-discharge valve 130 is provided in upper surface 121. When the temperature of battery cell 100 is increased (thermal runaway) and internal pressure of housing 120 becomes more than or equal to a predetermined value due to gas generated inside housing 120, gas-discharge valve 130 discharges the gas to outside of housing 120.

Figure 3:
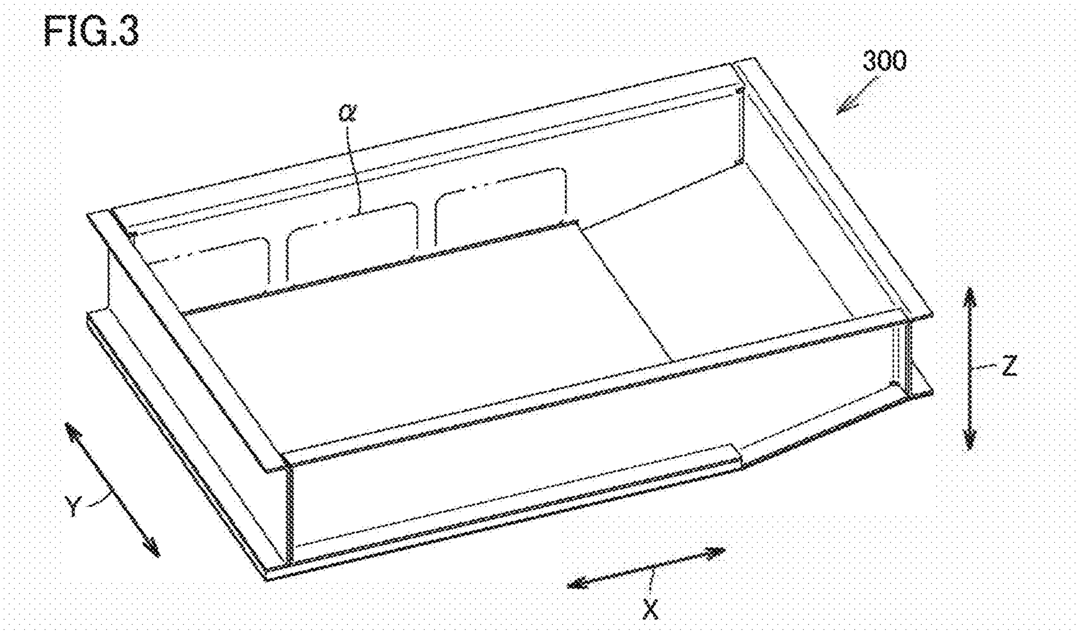
FIG. 3 is a perspective view showing a case member (except for a cover portion) of a battery pack.

FIG. 3 is a perspective view showing a case member 300 that accommodates battery cells 100. In each of FIG. 3, for convenience of illustration, a cover portion of case member 300 is not shown.

As shown in FIG. 3, case member 300 defines an inner space that accommodates battery cell 100. Stacks (battery assemblies 1) of the plurality of battery cells 100 stacked in the Y axis direction are accommodated in the inner space of case member 300. In the example of FIG. 3, battery assemblies 1 are arranged in three rows in the X axis direction, but the number of rows of battery assemblies 1 is not particularly limited in the battery pack according to the present technology.

Side surface portions of case member 300 directly support the stacks of battery cells 100 while restraining the stacks in the Y axis direction (Cell-to-Pack structure). At portions a in FIG. 3, the stacks of battery cells 100 are in abutment with case member 300. It should be noted that case member 300 is not limited to one that directly supports the stacks of battery cells 100, and a battery module having a structure in which the plurality of battery cells 100 are restrained by a restraint member may be accommodated in case member 300 (Cell-Module-Pack structure).

Figure 4:
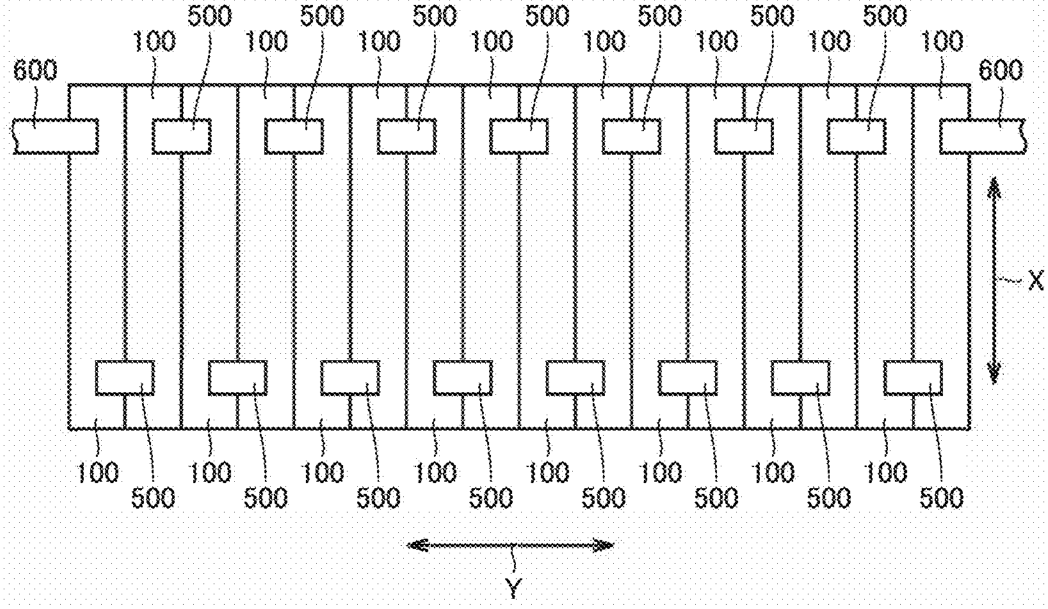
FIG. 4 is a diagram showing an arrangement of bus bars included in the battery assembly.

FIG. 4 is a diagram showing an arrangement of bus bars 500, 600. Bus bars 500 connect between electrode terminals 110 of the plurality of battery cells 100. In battery assembly 1 according to the present embodiment, positive electrode terminal 111 and negative electrode terminal 112 of adjacent battery cells 100 are electrically connected together by bus bar 500, with the result that the plurality of battery cells 100 are electrically connected together in series. Alternatively, although not shown in the figures, battery assembly 1 may be formed in the following manner: a plurality of groups of battery cells 100 connected together in parallel are connected together in series.

In the example of FIG. 4, bus bars 600 are connected to electrode terminals 110 of two battery cells 100 located at both end portions in the Y axis direction. Each of bus bars 600 is a terminal electrically connected to a component (inclusive of another battery assembly 1) external to battery assembly 1.

Each of FIGS. 5 and 6 is a diagram showing an arrangement of bus bars 500, 600 in a battery pack according to a reference example. In each of the examples shown in FIGS. 5 and 6, three battery assemblies 1A, 1B, 1C arranged in three rows in the X axis direction are provided.

In each of battery assemblies 1A, 1B, 1C, positive electrode terminal 111 and negative electrode terminal 112 of adjacent battery cells 100 are connected to each other by bus bar 500. Bus bars 600 connect electrode terminals 110 of different battery assemblies among battery assemblies 1A, 1B, 1C.

Collective-terminal bus bars 600A, 600B are provided as collective terminals for different polarities of battery assemblies 1A, 1B, 1C. When collective-terminal bus bars 600A, 600B are drawn from one side in the X axis direction (transverse direction), one collective terminal (collective-terminal bus bar 600B) becomes long as shown in FIGS. 5 and 6. Further, in the example of FIG. 6, not only collective-terminal bus bar 600B but also a bus bar 600 that connects battery assembly 1A and battery assembly 1B are formed to be long.

The long lengths of collective-terminal bus bar 600B and bus bar 600 leads to increased manufacturing cost of the battery pack. Moreover, vibration and impact acting on bus bar 600 are increased and it becomes difficult to secure an insulation distance for other components (for example, a battery cell 100, a frame, and the like), with the result that a degree of freedom in designing the battery pack can be reduced.

Figure 7:
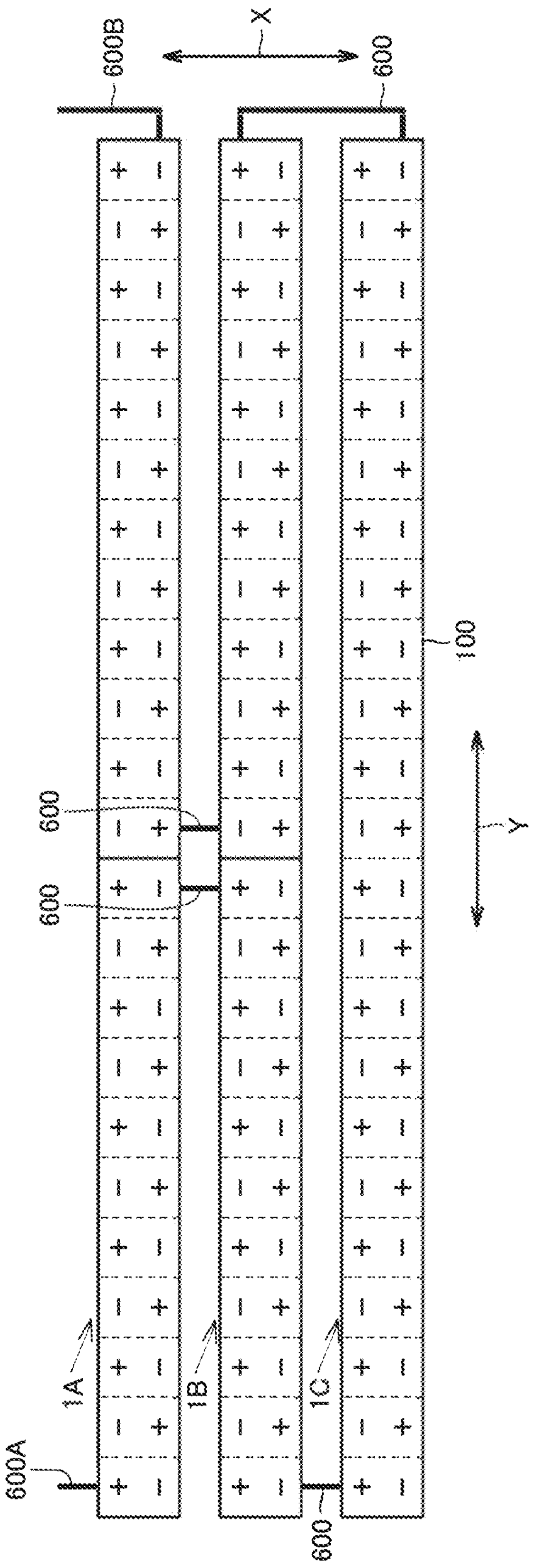

FIG. 7 is a diagram showing an arrangement of bus bars 500, 600 in a battery pack according to the present embodiment.

In the example of FIG. 7, the battery pack includes a battery assembly 1A (first battery assembly), a battery assembly 1B (second battery assembly), and a battery assembly 1C (third battery assembly). Three battery assemblies 1A, 1B, 1C are arranged in three rows in the X axis direction. Each of battery assemblies 1A, 1B, 1C includes a plurality of battery cells 100 arranged side by side in the Y axis direction (first direction) (in the illustrated example, the number of the plurality of battery cells is 23, but is not limited thereto). The plurality of (23) battery cells 100 included in each of battery assemblies 1A, 1B, 1C shown in FIG. 7 are restrained in the Y axis direction.

Each of two bus bars 600 that connect battery assembly 1A and battery assembly 1B together is joined to an electrode terminal 110 of a battery cell 100 (first battery cell) located at a certain portion of battery assembly 1A in the Y axis direction and an electrode terminal 110 of a battery cell 100 (second battery cell) located at a certain portion of battery assembly 1B in the Y axis direction. More specifically, bus bar 600 that connects battery assembly 1A and battery assembly 1B together is provided in the vicinity of a central portion of each of battery assemblies 1A, 1B in the Y axis direction. The expression "vicinity of the central portion" herein means a range of a block located at the center when the battery assembly is divided into three blocks in the Y axis direction.

In the example shown in FIG. 7, since electrode terminal 110 of battery cell 100 located at the certain portion of battery assembly 1A in the Y axis direction is connected to electrode terminal 110 of battery cell 100 located at the certain portion of battery assembly 1B in the Y axis direction, both collective-terminal bus bars 600A, 600B can be provided in battery assembly 1A. As a result, the lengths of bus bars 600 and collective-terminal bus bars 600A, 600B in the X axis direction can be short, thereby reducing vibration and impact acting on bus bars 600 and collective-terminal bus bars 600A, 600B. Further, an insulation distance for the other components is likely to be secured, thus resulting in an improved degree of freedom in designing the battery pack.

Next, the following describes a modification of the arrangement of bus bars 500, 600 with reference to FIGS. 8 to 13.

Figure 8:
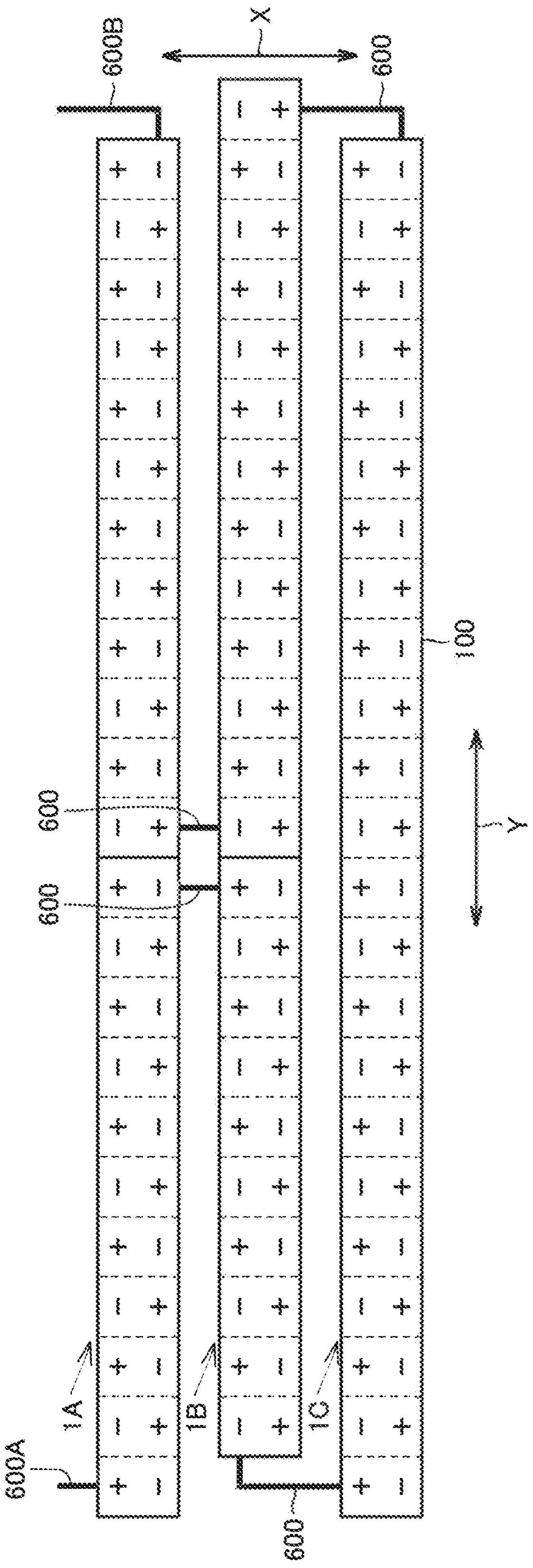

In the example of FIG. 8, both end portions of each of battery assemblies 1A, 1C and both end portions of battery assembly 1B are disposed at positions separated from each other in the Y axis direction. A reaction force absorbing member or the like is provided in a vacant space obtained by arranging battery assemblies 1A, 1B, 1C in the above-described manner. Each of two bus bars 600 that connect battery assembly 1A and battery assembly 1B together is joined to an electrode terminal 110 of a battery cell 100 located at a certain portion of battery assembly 1A in the Y axis direction and an electrode terminal 110 of a battery cell 100 located at a certain portion of battery assembly 1B in the Y axis direction.

Figure 9:
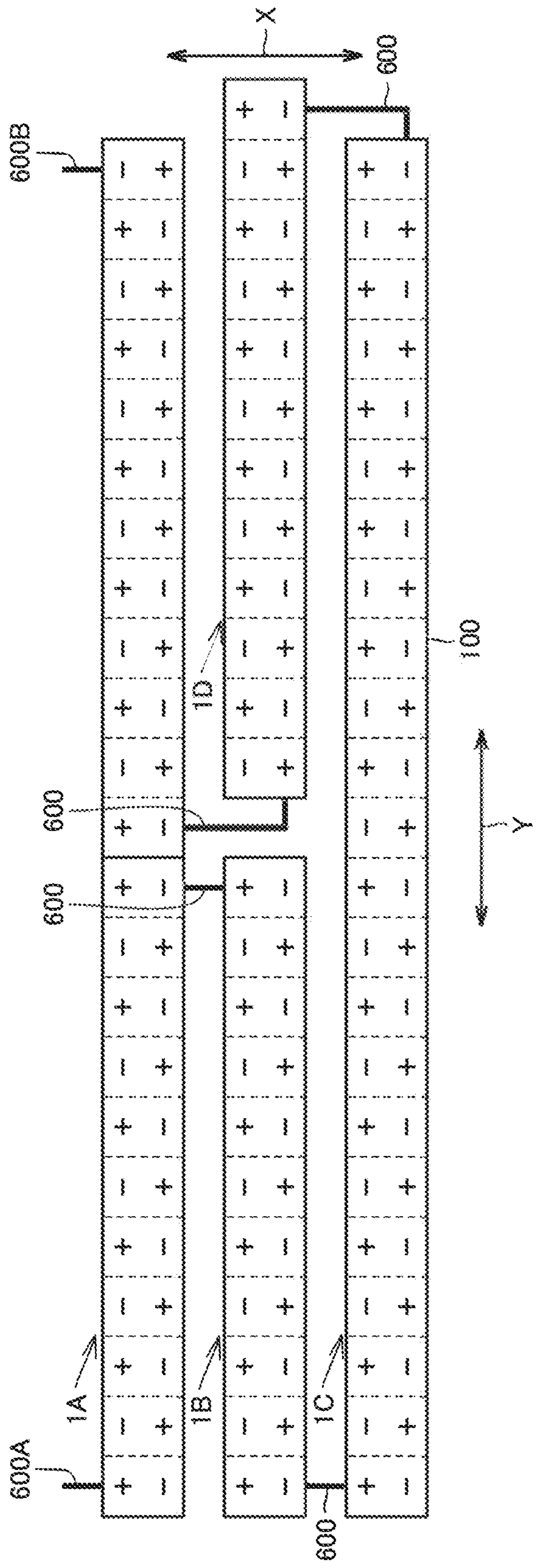

In the example of FIG. 9, two battery assemblies 1B, 1D divided in the Y axis direction are disposed between battery assemblies 1A, 1C. End portions of battery assemblies 1A, 1C and both end portions of battery assembly 1D are disposed at positions separated from each other in the Y axis direction. A reaction force absorbing member or the like is provided in a vacant space obtained by arranging battery assemblies 1A, 1B, 1C, 1D in the above-described manner. Each of two bus bars 600 that connect battery assembly 1A to battery assemblies 1B, 1D is joined to an electrode terminal 110 of a battery cell 100 located at a certain portion of battery assembly 1A in the Y axis direction and an electrode terminal 110 of a battery cell 100 located at the end portion of battery assembly 1B, 1D.

Figure 10:
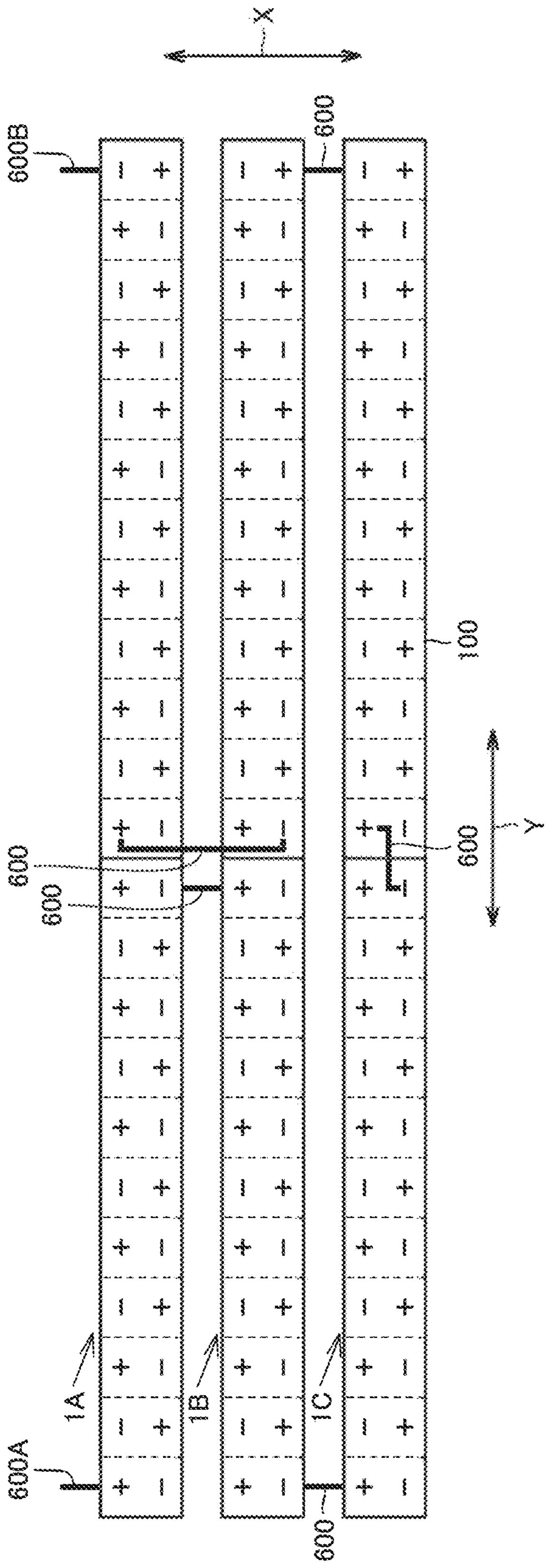

In the example of FIG. 10, the arrangement of battery cells 100 of battery assemblies 1A, 1B, 1C is changed in the vicinity of the central portion in the Y axis direction (the positive and negative polarities are reversed from those in the example of FIG. 7). Each of two bus bars 600 that connect battery assembly 1A to battery assembly 1B is joined to an electrode terminal 110 of a battery cell 100 located at a certain portion of battery assembly 1A in the Y axis direction and an electrode terminal 110 of a battery cell 100 located at a certain portion of battery assembly 1B in the Y axis direction.

Figure 11:
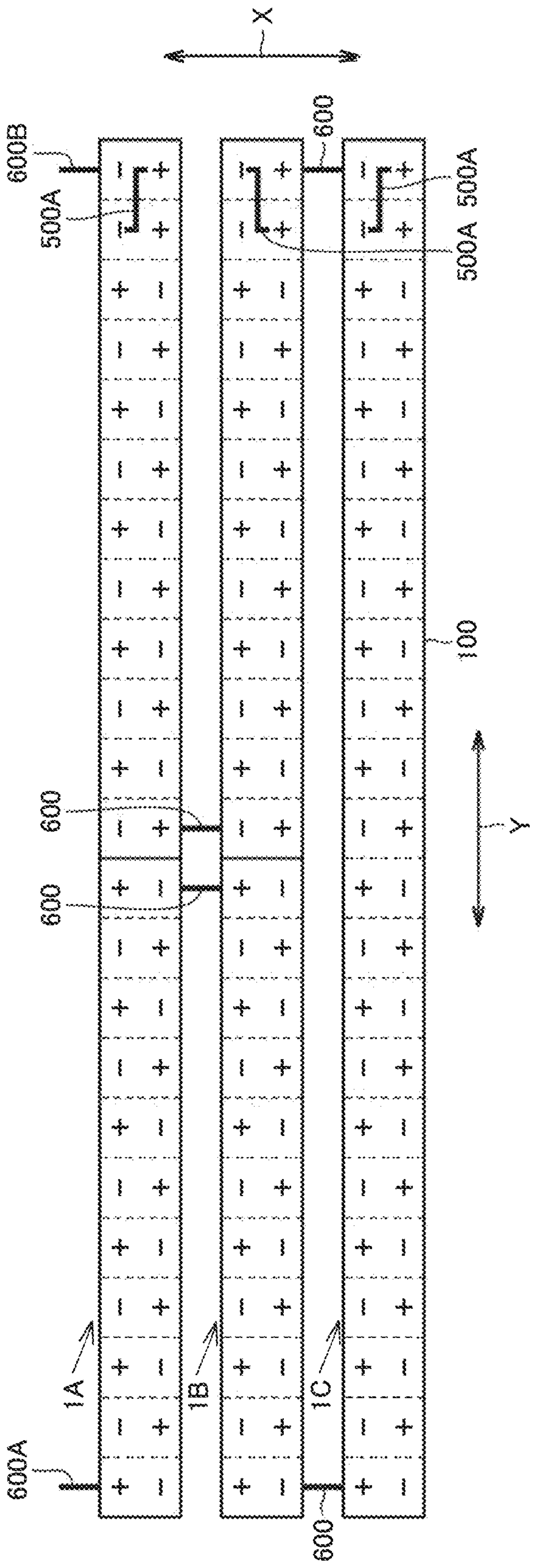

In the example of FIG. 11, the arrangement of battery cells 100 of battery assemblies 1A, 1B, 1C is changed in the vicinity of an end portion in the Y axis direction (positive and negative polarities are reversed from those in the example of FIG. 7). Bus bars 500A each having a shape different from that of an ordinary bus bar 500 are provided at this portion. Each of two bus bars 600 that connect battery assembly 1A and battery assembly 1B together is joined to an electrode terminal 110 of a battery cell 100 located at a certain portion of battery assembly 1A in the Y axis direction and an electrode terminal 110 of a battery cell 100 located at a certain portion of battery assembly 1B in the Y axis direction.

Figure 12:
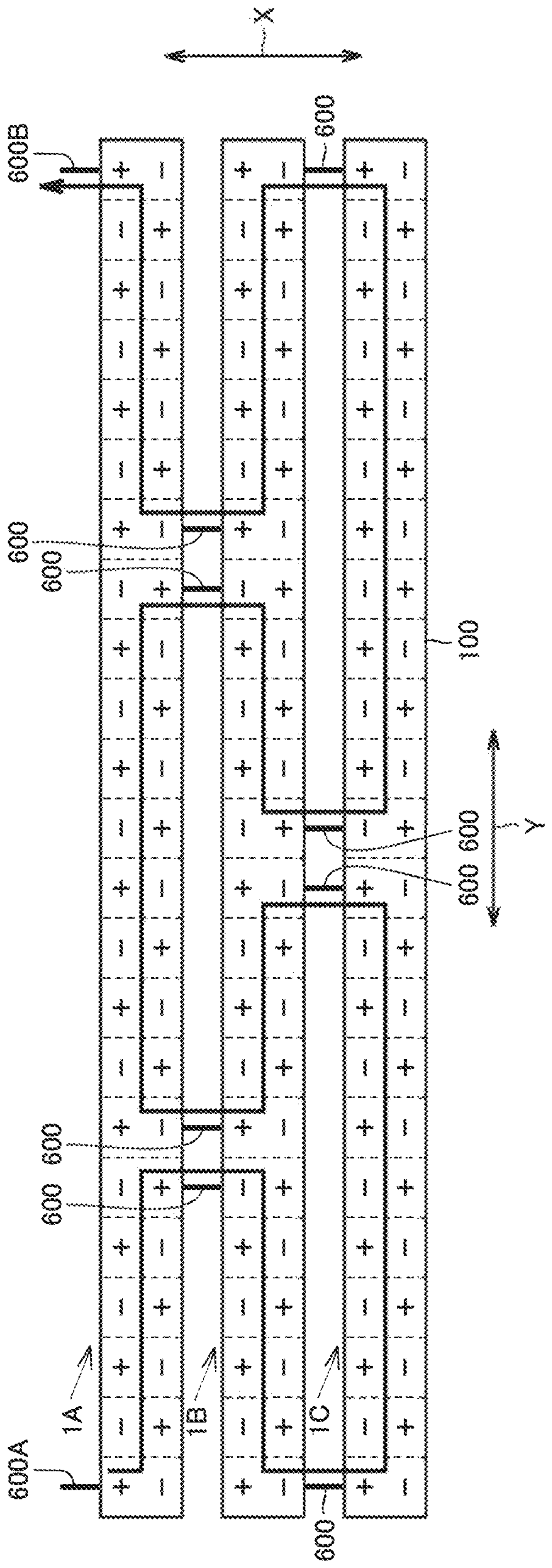
Figure 13:
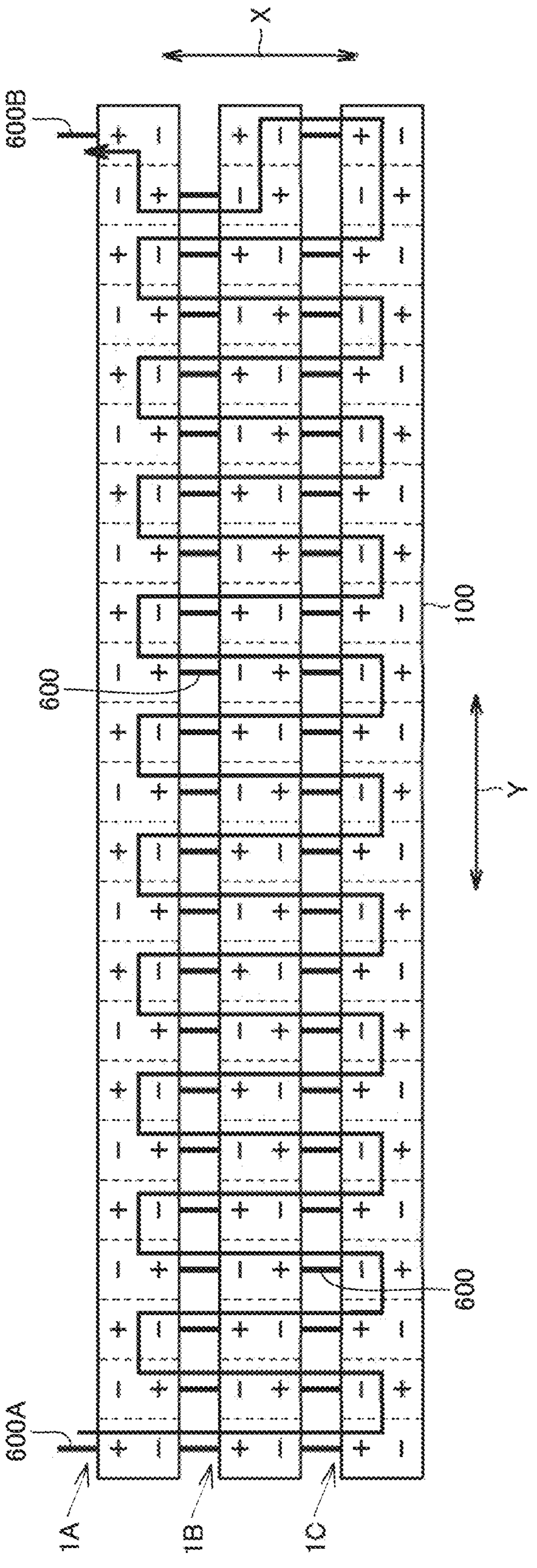

In each of the examples of FIGS. 12 and 13, the arrangement of battery cells 100 of battery assemblies 1A, 1B, 1C is the same as that of the example of FIG. 7; however, the arrangement of bus bars 600 that connect battery assemblies 1A, 1B, 1C together is changed. As shown in FIGS. 12 and 13, the number and arrangement of bus bars 600 provided at the certain portions of battery assemblies 1A, 1B, 1C can be appropriately changed.

Further, battery assemblies 1 are not limited to being arranged in three rows as shown in FIGS. 7 to 13, and may be arranged in two rows, four rows, or more rows.

Although the embodiments of the present invention have been described and illustrated in detail, it is clearly understood that the same is by way of illustration and example only and is not to be taken by way of limitation, the scope of the present invention being interpreted by the terms of the appended claims. The scope of the present invention is defined by the terms of the claims, and is intended to include any modifications within the scope and meaning equivalent to the terms of the claims.

What is claimed is:

1. A battery pack, comprising:

a first battery assembly including a plurality of first battery cells arranged in a first direction;

a second battery assembly including a plurality of second battery cells arranged in the first direction, the second battery assembly being arranged beside the first battery assembly along a second direction orthogonal to the first direction;

a third battery assembly including a plurality of third battery cells arranged in the first direction;

a first collective-terminal bus bar as a collective terminal for positive polarity; and a second collective-terminal bus bar as a collective terminal for negative polarity, wherein each of the plurality of first battery cells and the plurality of second battery cells includes an electrode terminal, the battery pack further comprising a bus bar joined to an electrode terminal of a first battery cell located at a certain portion of the first battery assembly in the first direction and an electrode terminal of a second battery cell, in the plurality of first battery cells, adjacent battery cells are electrically connected together in series without being connected together in parallel, in the plurality of second battery cells, adjacent battery cells are electrically connected together in series without being connected together in parallel, two end portions of the first battery assembly in the first direction and two end portions of the second battery assembly in the first direction are disposed at positions separated from each other in the first direction, the first collective-terminal bus bar and the second collective-terminal bus bar are provided in the first battery assembly, the first collective-terminal bus bar and the second collective-terminal bus bar are arranged in the first direction and are drawn from a side of the first battery assembly in the second direction, the third battery assembly is arranged beside the second battery assembly along the second direction, the first battery assembly, the second battery assembly, and the third battery assembly are arranged in this order in the second direction, and the first battery assembly, the second battery assembly, and the third battery assembly are electrically connected in series in a path extending from the first collective-terminal bus bar to the second collective-terminal bus bar through, in order: a first part of the plurality of first battery cells, a first part of the plurality of second battery cells, the plurality of third battery cells, a second part of the plurality of second battery cells, and a second part of the plurality of first battery cells.

2. The battery pack according to claim 1, wherein the bus bar is joined to the electrode terminal of the first battery cell located at the certain portion of the first battery assembly in the first direction and the electrode terminal of the second battery cell located at a certain portion of the second battery assembly in the first direction.

3. The battery pack according to claim 1, further comprising a case member that accommodates the first battery assembly and the second battery assembly, wherein the case member restrains the first battery cells and the second battery cells in the first direction.

4. The battery pack according to claim 1, wherein the bus bar is joined to the electrode terminal of the first battery cell located at the certain portion of the first battery assembly in the first direction and the electrode terminal of the second battery cell located at a certain portion of the second battery assembly in the first direction, the battery pack further comprising a case member that accommodates the first battery assembly and the second battery assembly, wherein the case member restrains the first battery cells and the second battery cells in the first direction.

5. The battery pack according to claim 1, wherein the bus bar is provided in a vicinity of a central portion of each of the first battery assembly and the second battery assembly in the first direction.

6. The battery pack according to claim 1, wherein the bus bar is joined to the electrode terminal of the first battery cell located at the certain portion of the first battery assembly in the first direction and the electrode terminal of the second battery cell located at a certain portion of the second battery assembly in the first direction, and the bus bar is provided in a vicinity of a central portion of each of the first battery assembly and the second battery assembly in the first direction.

7. The battery pack according to claim 1, further comprising a case member that accommodates the first battery assembly and the second battery assembly, wherein the case member restrains the first battery cells and the second battery cells in the first direction, and the bus bar is provided in a vicinity of a central portion of each of the first battery assembly and the second battery assembly in the first direction.

8. The battery pack according to claim 1, wherein the bus bar is joined to the electrode terminal of the first battery cell located at the certain portion of the first battery assembly in the first direction and an electrode terminal of a second battery cell located at a certain portion of the second battery assembly in the first direction, and the battery pack further comprises a case member that accommodates the first battery assembly and the second battery assembly, wherein the case member restrains the first battery cells and the second battery cells in the first direction, and the bus bar is provided in a vicinity of a central portion of each of the first battery assembly and the second battery assembly in the first direction.

9. The battery pack according to claim 1, wherein the third battery assembly includes two end portions in the first direction, the battery pack has first and second opposite sides in the first direction, at the first side of the battery pack, one of the two end portions of the first battery assembly and one of the two end portions of the third battery assembly protrude, along the first direction, beyond one of the two end portions of the second battery assembly, and at the second side of the battery pack, another one of the two end portions of the second battery assembly protrudes, along the first direction, beyond another one of the two end portions of the first battery assembly and another one of the two end portions of the third battery assembly.

* * * * *